(12) United States Patent
Lelong-Feneyrou et al.

(10) Patent No.: US 7,031,560 B2
(45) Date of Patent: Apr. 18, 2006

(54) RESONANT SENSOR WITH OPTICAL EXCITATION AND MONITORING DEVICE USING THIS SENSOR

(75) Inventors: Sandrine Lelong-Feneyrou, Igny (FR); Olivier Nicolet, Le Perray en Yvelines (FR); Gilles Amendola, Noisy le Grand (FR); Hua Chen, Noisy le Grand (FR); Olivier Francais, Noisy le Grand (FR); Frédéric Marty, Noisy le Grand (FR); Olivier Robert, Noisy le Grand (FR); Olivier Gigan, Crolles Cedex (FR)

(73) Assignee: Schlumberger Technology Corporation, Sugarland, TX (US)

( * ) Notice: Subject to any disclaimer, the term of this patent is extended or adjusted under 35 U.S.C. 154(b) by 155 days.

(21) Appl. No.: 10/485,186

(22) PCT Filed: Jul. 17, 2002

(86) PCT No.: PCT/EP02/08043

§ 371 (c)(1),
(2), (4) Date: Jun. 24, 2004

(87) PCT Pub. No.: WO03/014689

PCT Pub. Date: Feb. 20, 2003

(65) Prior Publication Data

US 2004/0231409 A1    Nov. 25, 2004

(30) Foreign Application Priority Data

Aug. 9, 2001    (FR)   ............................. 01 106640

(51) Int. Cl.
     *G02B 6/00*      (2006.01)
     *G01J 1/04*      (2006.01)

(52) U.S. Cl. ........................... 385/12; 385/13; 385/14; 250/227.14; 250/227.18

(58) Field of Classification Search ................. 385/12, 385/13, 14, 129, 130, 131; 250/227.11, 227.14, 250/227.18, 227.19
See application file for complete search history.

(56) References Cited

U.S. PATENT DOCUMENTS

| 4,567,451 | A | | 1/1986 | Greenwood |
| 4,678,904 | A | * | 7/1987 | Saaski et al. ........... 250/227.27 |
| 4,933,545 | A | * | 6/1990 | Saaski et al. ........... 250/227.14 |
| 4,983,824 | A | * | 1/1991 | Saaski et al. ........... 250/227.27 |
| 5,521,884 | A | | 5/1996 | Humphries et al. |

(Continued)

FOREIGN PATENT DOCUMENTS

EP      0 672 897 A2      9/1995     ............... 385/92 X (Continued)

OTHER PUBLICATIONS

Kvisteroy et al., "Optically Excited Silicon Sensor for Permanently installed Donwhole Pressure Monitoring Applications," *Sensor and Actuators A.31*, Mar. 1992, Lausanne, Switzerland, pp. 164-167.

(Continued)

*Primary Examiner*—Brian M. Healy
(74) *Attorney, Agent, or Firm*—Victor H. Segura; Brigitte L. Echols

(57) ABSTRACT

Resonant sensor with optical excitation and monitoring device using this sensor. This sensor comprises a doped silicon resonator (4) to absorb radiation (Re) with wavelength longer than 1100 nm and may be used for example to monitor the pressure in an oil well.

13 Claims, 2 Drawing Sheets

U.S. PATENT DOCUMENTS 5,844,236 A * 12/1998 Wilson .................. 250/227.14
2004/0231409 A1 * 11/2004 Lelong-Feneyrou
 et al. ........................ 73/152.51

FOREIGN PATENT DOCUMENTS

| EP | 0 672 897 A3 | 7/1996 | ............... 385/92 X |
| GB | 2121953 | 1/1984 | ............... 385/12 X |
| WO | WO 98/31996 | 7/1998 | ............... 385/12 X |

OTHER PUBLICATIONS

Wilson et al., "Distributed Micromachined Sensor Network," *SPIE vol. 3007*, Feb. 13, 1997, pp. 92-98.

* cited by examiner

RESONANT SENSOR WITH OPTICAL EXCITATION AND MONITORING DEVICE USING THIS SENSOR

TECHNICAL FIELD

This invention relates to a resonant sensor with optical excitation and a monitoring device using this sensor.

It is particularly applicable to monitoring the pressure in an oil well.

STATE OF PRIOR ART

It is known that many resonant sensors have been made by micro-machining silicon. In particular, these sensors can be used to measure absolute pressures, differential pressures, viscosities, densities, stresses, forces and displacements.

Various principles can be used for excitation and for reading a resonant sensor and depend essentially on the vibration frequency of the resonant element in this sensor and the target performances.

In general, excitation consists of supplying a given quantity of energy to the resonant element. This energy may be supplied temporarily or continuously and, for example its nature may be acoustic, electrostatic or optical.

Reading, or detection, is based on determination of the vibration frequency of the resonant element and its nature may be, for example, capacitive, piezo-resistive, optical or acoustic.

The use of optical means for excitation and detection is very attractive since it makes it possible to use optical fibers with such means.

Various resonant sensors made of silicon are already known that are coupled to optical excitation and detection means through optical fibers.

Radiation that the silicon is capable of absorbing with a wavelength less than the wavelength at which the silicon is transparent, is necessary to excite the silicon resonant element in this type of sensor.

A photo-elastic effect is used to excite this resonant element. The light energy is firstly converted to thermal energy. A temperature gradient is created due to the differential optical absorption generated in the solid silicon. This temperature gradient is then converted into a mechanical gradient (a thermo-mechanical interaction can be used).

The quantity of energy necessary to satisfactorily excite the resonant element and create a sufficient variation in the vibration amplitude of this element to detect the vibration frequency can be calculated. This quantity of energy depends mainly on the number of photons absorbed by the element.

All known resonant sensors with optical excitation use wavelengths less than the wavelength of the prohibited band of silicon, in other word 1100 nm, for excitation of their resonant element. The undoped silicon is transparent at higher values, and therefore its absorption is negligible. Unfortunately, optical signals with these wavelengths are quickly attenuated by silica optical fibers used for optical telecommunications and therefore these signals cannot be transported over long distances with this type of fiber.

DESCRIPTION OF THE INVENTION

The purpose of this invention is to overcome this disadvantage.

The invention can be used for optical excitation of the resonant element of the sensors considered above using radiation with wavelengths exceeding 1100 nm, particularly used for optical telecommunications.

The consequences of this invention are immediate; a sensor conform with the invention may be associated with an inexpensive silica optical fiber, like those used for optical telecommunications.

The excitation radiation of the resonant element can then be transported over long distances, for example several kilometers, by this type of fiber.

Therefore the invention enables monitoring of physical parameters over very long distances using inexpensive very high performance silicon resonant sensors, and optical fiber networks using standard fibers.

Specifically, the purpose of this invention is a resonant sensor with optical excitation, this sensor comprising a silicon resonant element designed to absorb incident radiation, this sensor being characterized in that the resonant element is made of doped silicon so that this resonant element can absorb incident radiation at a wavelength greater than 1100 nm.

Preferably, the resonant element is made of doped silicon, so that this resonant element can absorb incident radiation with a wavelength of between 1300 nm and 1600 nm.

According to a preferred embodiment of the sensor according to the invention, doping of the silicon in the resonant element is of the P type.

Preferably, this doping shall be equal to at least $5 \times 10^{17}$ atoms per $cm^3$, hence sufficient absorption for radiation with a wavelength greater than 1100 nm.

The sensor according to the invention may be a pressure sensor.

In this case, the resonant element may be fixed to the inside of a package formed from a cover and a base assembled to each other.

Preferably, the cover and the base are formed entirely or almost entirely from silicon, the pressure to be detected being applied around the package.

The sensor according to the invention may also comprise an optical fiber to carry the radiation as far as the resonant element of the sensor.

If the package mentioned above is used, this package is preferably provided with an air tight passage for this optical fiber.

The optical fiber may also be intended to transmit a read radiation or detection radiation to the sensor according to the invention, at the same time as the excitation, this read radiation being outside the silicon absorption band but within the optic fiber transparency band, the wavelength of this read radiation preferably being equal to 1550 nm.

This invention also relates to a device for monitoring at least one parameter of a well, and particularly the pressure, this device comprising a network of sensors intended to measure this or these parameters and distributed along at least part of the well, this sensors being connected to surface means, these surface means controlling and processing the signals supplied by these sensors, device in which each of the sensors is a sensor according to the invention.

If each of these sensors is provided with an optical fiber, it may be connected to the control and processing means through this optical fiber.

BRIEF DESCRIPTION OF THE DRAWINGS

This invention will be better understood after reading the description of example embodiments given below for information only and in no way limitative, with reference to the attached drawings on which.

DETAILED DESCRIPTION OF PARTICULAR EMBODIMENTS

Figure 1:
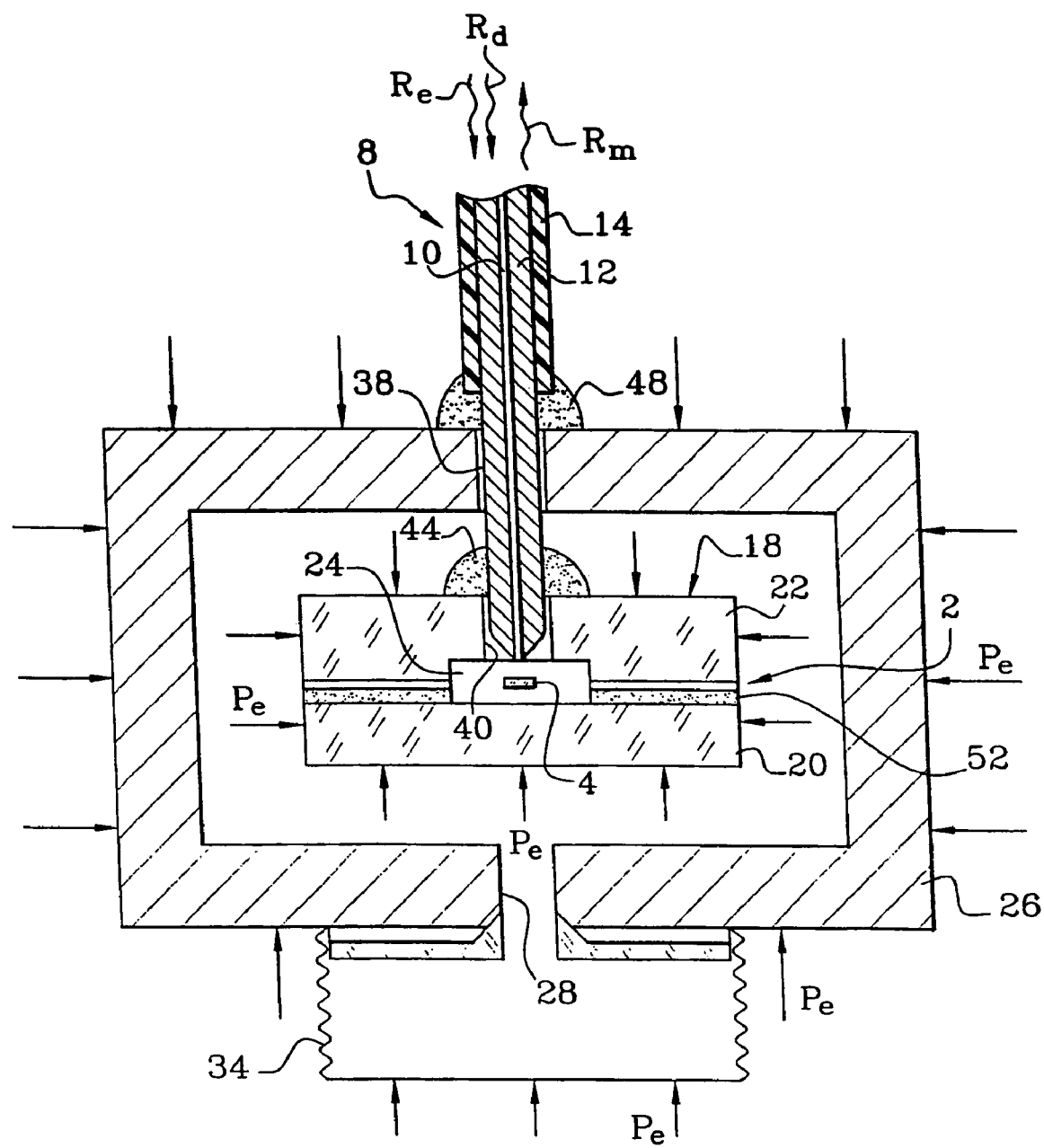
FIG. 1 is a diagrammatic cross sectional view of a particular embodiment of the resonant sensor according to the invention.

The resonant sensor with optical excitation 2 according to the invention, shown diagrammatically in a cross sectional view in FIG. 1, is a pressure sensor that is suitable for detection of high pressures, for example pressures exceeding $10^8$ Pa.

This pressure sensor comprises a resonator or resonant element 4 that is preferably subjected to a vacuum.

The resonant frequency of the resonator 4 varies with the pressure Pe that is applied to the sensor. The resonator 4 is excited by applying optical energy to it that is usually amplitude modulated, and a variation of its resonant frequency is detected optically. This variation of the resonant frequency is the result of a variation in the pressure to be detected.

The sensor in FIG. 1 is provided with a multimode silica optical fiber 8, for example of the 62.5/125G.I. type, for which the core 10, the optical cladding 12 and the protective cladding 14 can be seen.

This optical fiber 8 is optically coupled to the resonator 4 and is intended to transmit excitation, detection and measurement radiation Re, Rd and Rm.

More precisely, this fiber 8 is intended for the propagation of excitation radiation Re, designed to excite the resonator 4, propagation of detection radiation Rd or read radiation, intended to detect the variation of the resonant frequency of this resonator 4, and for propagation of measurement radiation Rm that is reflected by the resonator 4 and is composed of the radiation Rd that interacted with this resonator.

For example, the wavelength λe of the excitation radiation Re is equal to 1550 nm while the wavelength λd of the detection radiation Rd is equal to 1360 nm for example.

More generally, λe and λd are chosen to be greater than 1100 n, preferably within the range varying from 1300 nm to 1550 nm used for optical telecommunications.

According to the invention, the resonator 4 is made of monocrystalline silicon that is doped so that it can absorb the excitation radiation Re with wavelength greater than 1100 nm. This doping is of the P type and is obtained for example with boron.

This doping is greater than $0.5 \times 10^{18}$ atoms/cm$^3$ and preferably equal to at least $10^{18}$ atoms/cm$^3$. For example, it is equal to $2 \times 10^{19}$ atoms/cm$^3$ and in this case the absorption of silicon is equal to 100 cm$^{-1}$ if λe is equal to 1550 nm.

The resonator 4 is fixed to a package 18 inside which it is installed.

This package 18 is formed from a base 20 and a cover 22 that cooperate. This base 20 and this cover 22 are made entirely or almost entirely from monocrystalline silicon and the pressure to be detected Pe is applied around the package 18.

When they are assembled to each other, the base 20 and the cover 22 delimit a cavity 24 inside which the resonator 4 is suspended. The package 18 is hermetically sealed and the pressure inside the cavity 24 is different from the pressure to be detected.

Preferably, a primary vacuum is created in this cavity 24 to avoid damping the vibrations of the resonator 4 when it is excited.

The package 18 is placed inside a protective chamber 26 that may be metallic. This protective chamber 26 is subjected to the pressure Pe to be detected on the outside, this pressure being imposed through a medium in which the chamber 26 is immersed. It is a gas or a liquid, and more generally a fluid.

This chamber 26 is provided with pressure equalization means, such that the same pressure Pe may be setup on the inside or outside.

In the example shown in FIG. 1, these means comprise a capillary 28 that penetrates into the chamber 26, and a bellows 34 that is fixed to the outside wall of the chamber 26 in a leak tight manner around the area into which the capillary 28 opens up.

The chamber 26 and the cover 22 are provided with coaxial drillings 38 and 40 respectively to allow passage of the fiber 8. The end of this fiber is approximately the same level as the upper part of the cavity 24.

In the example in FIG. 1, optical coupling between the fiber 8 and the resonator 4 is provided in a known manner by the roof-shaped end of the fiber 8.

Further information on this subject can be found in document FR 2 739 445 A.

The diameters of drillings 38 and 40 are very slightly greater than the diameter of the optical cladding 12.

As can be seen, the fiber does not have any protective cladding at its end.

A coat of epoxy resin 44 covers the periphery of the optical cladding 12 that emerges from the drilling 40 and the top part of the cover 22 located close to this drilling 14, this layer 44 forming a leak tight sealing system.

A coat of epoxy resin 48 covers the periphery of the optical cladding 12 that emerges from the drilling 38 and the end of protective cladding 14.

This coat 48 also covers the upper part of the chamber 26 that is located close to the drilling 38. This coat 48 also forms a leak tight sealing system.

Therefore, the coats of epoxy resin 44 and 48 enable the optical cladding 12 to pass through the cover 22, and the chamber 26 in a leak tight manner and therefore cooperate with drillings 38 and 40 to form leak tight passages for the optical fiber.

However, leak tightness can be achieved by other means, for example such as welding or gluing.

Note that the package 18 is supported on the inside of the protective chamber 26 by the optical fiber 8.

In the example in FIG. 1, the base 20 is single piece but it comprises a sacrificial residual silica layer 22 that is sandwiched between two layers of silicon. The presence of this sacrificial residual layer 52 justifies the term "almost entirely" mentioned above.

In this example, the resonator 4 is in the form of a bridge, and its two ends are fixed to the base 20 and this resonator is suspended crosswise in the cavity 24.

When the base 20 is assembled with the cover 22, the resonator 4 has no contact with this base and this cover, except for its ends that are fixed to the base 20.

The package 18 is fixed by assembling the cover 22 and the base 20. This assembly can be made by welding under an oxidizing atmosphere. This weld is made by oxygen diffusion at the interface between the two parts to be assembled.

The sensor 2 in FIG. 1 can be made for example by using a silicon on insulator (SOI) type structure comprising:
- a silicon substrate designed to form the base 20;
- a silica layer on this substrate, this layer being used to form the layer 52, and
- a silicon layer on this silica layer, this silicon layer being used to form the resonator 4.

Photolithography followed by plasma etching of the silicon layer forms this resonator 4 that can then be doped with boron by local ionic implantation. However; it is simpler to use an SOI structure in which the silicon layer is doped with boron.

Isotropic etching, for example using undiluted hydrofluoric acid, can then be used to release this resonator 4 and obtain the base 20.

The cover 22 can be machined separately from a silicon wafer, and it is welded to the base 20, preferably keeping the cavity 24 under a vacuum.

Figure 2:
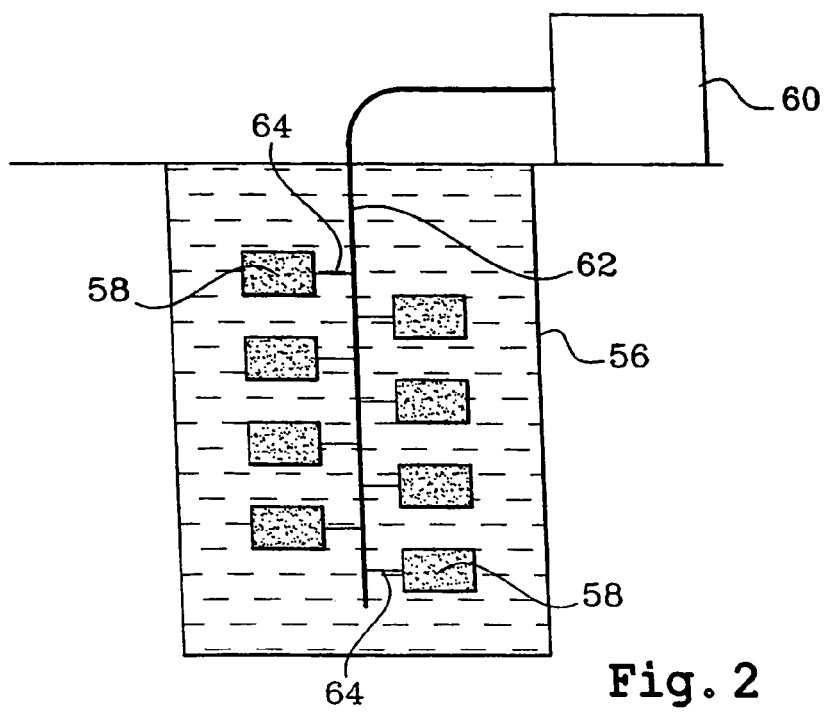
FIG. 2 is a diagrammatic sectional view of a particular embodiment of the monitoring device according to the invention.

A monitoring device according to the invention is diagrammatically shown in FIG. 2.

This device is designed to monitor the pressure in a well 56. This well may be any type of oil well, for example a deep well, a small diameter well, a side well or a multiple well.

The device in FIG. 2 comprises a network of pressure sensors 58 of the type shown in FIG. 1, this network being distributed along at least part of the well and connected to surface means 60 through an optical cable 62 with a length of up to several kilometers, for example 5 km.

This cable is formed from optical fibers 64 that are connected to the sensors 58 as described above.

The surface means 60 are designed to send the excitation radiation Re and the detection radiation Rd to each of the sensors 58, to detect the measurement radiation Rm output from each of these sensors and to process this measurement radiation to determine the pressure at the sensor 58 that corresponds to it.

Figure 3:
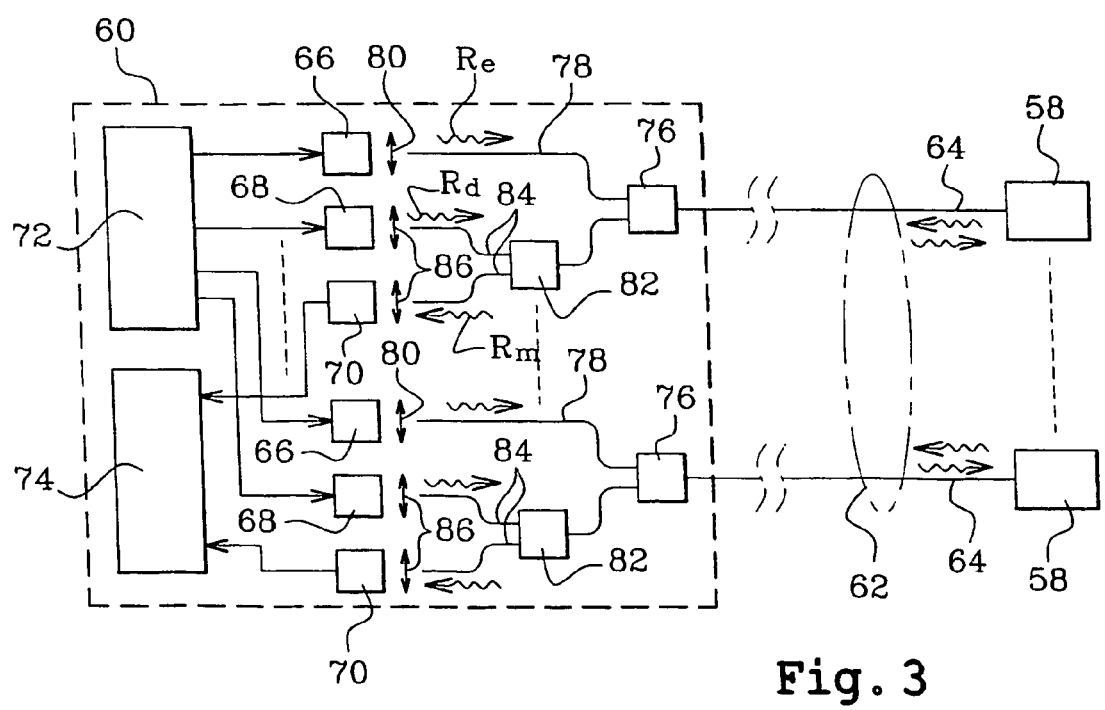
FIG. 3 is a diagrammatic view of signal controlling and processing means, forming part of the monitoring device shown in FIG. 2.

FIG. 3 diagrammatically represents an example of surface means 60 and includes:
- laser diodes 66 designed to emit excitation radiation Re and associated with corresponding sensors 58,
- laser diodes 68 designed to emit detection radiation Rd and associated with corresponding sensors 58,
- photodiodes 70 designed to detect measurement radiation Rm output from each of the sensors 58,
- control means 72 for laser diodes 66 and 68, and
- amplification and processing means 74 for the electrical signals output by photodiodes 70, to determine pressures at the sensors 58.

These amplification and processing means 74 are provided with means not shown, intended to display the results of measurements made using sensors 58.

Furthermore, for each sensor 58, the surface means 60 comprise a wavelength multiplexer 76 that is optically connected at one end to the corresponding fiber 64, and at the other end,
- firstly to the corresponding laser diode 66, though an optical fiber 78 and a lens 80, and
- secondly to one channel of a 2×1 type optical coupler 82, one of the other two channels being coupled to the laser diode 68 and the other channel to the photodiode 70 through optical fibers 84 and lenses 86 as shown in FIG. 3.

The invention is not limited to monitoring the, pressure in an oil well. It is also applicable to monitoring the pressure in any other fluid.

Furthermore, the invention is not limited to pressure measurements. Resonant sensors with optical excitation conform with the invention can be made to measure other parameters than pressure, for example temperature.

Note also that only the resonant element of a sensor conform with the invention needs to be made of doped silicon. The rest of the sensor may be made of one or more other materials.

The invention claimed is:

1. An optical excitation resonant sensor, comprising a resonant element made of silicon and capable of absorbing incident radiation (Re), whereby the resonant element is made of silicon doped with P-type doping at a level of least $5 \times 10^{17}$ atoms per cm$^3$, such that the resonant element is capable of absorbing incident radiation with a wavelength greater than 1100 nm.

2. The sensor of claim 1, wherein the resonant element is made of doped silicon capable of absorbing incident radiation (Re) with wavelengths in the range 1300 nm to 1600 nm.

3. The sensor of claim 1, further comprising a pressure sensor.

4. The sensor of claim 3, wherein the resonant element is fixed to the inside of a package formed of a cover and a base that cooperate.

5. The sensor of claim 4, wherein the cover and the base are entirely or almost entirely formed from silicon, the pressure to be detected (Pe) being applied around the package.

6. The sensor of claim 1, further comprising an optical fiber to carry the radiation (Re) as far as the resonant element of the sensor.

7. The sensor of claim 5, further comprising an optical fiber to carry the radiation (Re) as far as the resonant element of the sensor, the package being provided with a leak tight passage for this optical fiber.

8. The sensor of claim 6, wherein the optical fiber is capable of transmitting a read radiation (Rd) to the sensor at the same time as the excitation, the read radiation being located outside the absorption band of silicon but within the transparency band of the optical fiber.

9. The sensor of claim 8, wherein the wavelength of the read radiation is 1550 nm.

10. A monitoring device capable of measuring pressure in a well, comprising a network of sensors distributed along at least part of the well, the sensors being connected to surface control and processing means for the signals supplied by the sensors, each sensor comprising a resonant element made of silicon and capable of absorbing incident radiation (Re), whereby the resonant element is made of silicon doped with P-type doping at a level of least $5 \times 10^{17}$ atoms per cm$^3$, such that the resonant element is capable of absorbing incident radiation with a wavelength greater than 1100 nm.

11. The monitoring device of claim 10, wherein each sensor is connected to the control and processing means through an optical fiber.

12. The monitoring device of claim 10, wherein the resonant element is made of doped silicon capable of absorbing incident radiation (Re) with wavelengths in the range 1300 nm to 1600 nm.

13. The monitoring device of claim 10, whereby each sensor further comprises a pressure sensor.

* * * * *